United States Patent
Sakanaka

(10) Patent No.: US 8,383,195 B2
(45) Date of Patent: Feb. 26, 2013

(54) PRODUCTION METHOD FOR LAMINATED ELECTRONIC COMPONENT

(75) Inventor: Atsushi Sakanaka, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 515 days.

(21) Appl. No.: 12/485,963

(22) Filed: Jun. 17, 2009

(65) Prior Publication Data

US 2010/0003397 A1   Jan. 7, 2010

(30) Foreign Application Priority Data

Jul. 2, 2008  (JP) ................................ 2008-173423

(51) Int. Cl.
*B05D 5/12* (2006.01)
*H01G 7/00* (2006.01)

(52) U.S. Cl. ............ 427/79; 427/80; 29/25.41; 29/25.42

(58) Field of Classification Search ................ 427/79, 427/80; 29/25.41, 25.42
See application file for complete search history.

(56) References Cited

U.S. PATENT DOCUMENTS

| | | | |
|---|---|---|---|
| 6,610,925 B1 * | 8/2003 | Wajima | 174/535 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2001/0019176 A1 * | 9/2001 | Ahiko et al. | 257/777 |
| 2005/0046536 A1 | 3/2005 | Ritter et al. | |
| 2006/0245141 A1 * | 11/2006 | Shirasu et al. | 361/303 |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0145551 A1 * | 6/2008 | Kunishi et al. | 427/430.1 |
| 2008/0158774 A1 | 7/2008 | Trinh | |
| 2008/0239617 A1 * | 10/2008 | Motoki et al. | 361/301.4 |

FOREIGN PATENT DOCUMENTS

| | | |
|---|---|---|
| JP | 05-226178 A | 9/1993 |
| JP | 10-022183 A | 1/1998 |
| JP | 2004-047707 A | 2/2004 |
| JP | 2004-312023 A | 11/2004 |

OTHER PUBLICATIONS

Official Communication issued in corresponding Japanese Patent Application No. 2008-173423, mailed on Aug. 21, 2012.

* cited by examiner

*Primary Examiner* — Brian K Talbot
(74) *Attorney, Agent, or Firm* — Keating & Bennett, LLP

(57) ABSTRACT

In a production method for a laminated electronic component, a ceramic base body is formed by stacking a plurality of ceramic layers, and internal electrodes are formed in the ceramic base body. Lead-out portions of the internal electrodes are exposed from side surfaces of the ceramic base body. Belt-shaped external terminal electrodes are formed on the side surfaces by plating so as to be electrically connected to the exposed portions of the internal electrodes. The distance from an end surface to an external terminal electrode closest to the end surface in the ceramic base body is measured. When the measured distance does not correspond to a predetermined reference value, the ceramic base body is removed as being defective.

4 Claims, 9 Drawing Sheets

PRODUCTION METHOD FOR LAMINATED ELECTRONIC COMPONENT

BACKGROUND OF THE INVENTION

1. Field of the Invention

The present invention relates to a production method for a laminated electronic component, and more particularly, to a production method for a laminated electronic component, such as a laminated ceramic capacitor array, in which a plurality of internal electrodes are provided between a plurality of ceramic layers.

2. Description of the Related Art

With recent size reduction of electronic apparatuses, such as mobile telephones and portable music players, the mounting density of electronic components on wiring boards included in the electronic apparatuses is increasing rapidly. In response to this, in order to reduce the mounting space and the number of components to be mounted, there is a demand for electronic components to include a plurality of circuit elements in one chip. As such electronic components, array type electronic components represented by a capacitor array are used.

An array type multiterminal electronic component includes a laminated body having a substantially rectangular parallelepiped shape. A plurality of substantially belt-shaped external terminal electrodes are provided on side surfaces of the laminated body.

Japanese Unexamined Patent Application Publication No. 2004-47707 discloses a typical laminated ceramic capacitor array. More specifically, referring to FIG. 9, first and second internal electrodes 111 and 112 are provided on each of the upper and lower ceramic layers 105 and 106. Lead-out portions of the internal electrodes 111 and 112 are exposed at side surfaces 102a and 102b of a ceramic base body 100, and are electrically connected to external terminal electrodes 121 and 122 provided on the side surfaces 102a and 102b. For example, the external terminal electrodes 121 and 122 are formed by applying electrode paste, as taught in Japanese Unexamined Patent Application Publication No. 10-22183.

In recent years, capacitor arrays have been required to have an increased capacity, and therefore, it is necessary to increase the areas of the internal electrodes 111 and 112. To increase the areas of the internal electrodes 111 and 112 while ensuring size reduction, it is necessary to reduce a side gap G between the capacity section and end surfaces 103a and 103b of the ceramic base body 100. However, if the side gap G is too small, adhesiveness between the ceramic layers 105 and 106 decreases, and moisture easily reaches the internal electrodes 111 and 112. This may cause failure, such as a short circuit.

Even if design dimensions are determined in view of the limit of the side gap, since a production process for the capacitor array includes other factors causing failure, such as layer misalignment or displacement due to cutting, the side gap is typically not provided specifically as designed. Accordingly, to remove defects by checking the side gap, portions of internal electrodes that are exposed at side surfaces of each ceramic base body are observed with an image pickup device, such as a camera, and the side gap is measured. Unfortunately, since the exposed portions are relatively small, measurement accuracy is reduced, and the operation is quite cumbersome. For this reason, in reality, the side gap is inevitably designed to be larger than required.

SUMMARY OF THE INVENTION

To overcome the problems described above, preferred embodiments of the present invention provide a production method for a laminated electronic component, which can accurately measure the side gap between an end surface of a ceramic base body and an internal electrode and which can minimize the size of the electronic component.

A production method for a laminated electronic component according to a preferred embodiment of the present invention includes the steps of stacking a plurality of ceramic layers to form a ceramic base body including first and second opposing principal surfaces, first and second opposing side surfaces, and first and second opposing end surfaces, and forming internal electrodes in the ceramic base body, the internal electrodes including portions exposed at the first side surface and having a width less than a width of the first side surface, forming substantially belt-shaped external terminal electrodes on the first side surface by plating, the external terminal electrodes having lower plating films electrically connected to the exposed portions of the internal electrodes, and measuring a distance from the first end surface to the external terminal electrode closest to the first end surface, and removing the ceramic base body as being defective when the measured distance does not meet a predetermined reference value.

In the above-described production method for the laminated electronic component, external terminal electrodes are formed on the first side surface of the ceramic base body by plating. Since the plating grows substantially equally from the centers of the exposed portions of the internal electrodes to the right and left, it can be determined whether or not the side gap is sufficient while the distance between the external terminal electrodes and the first end surface of the ceramic base body is replaced with the actual side gap. Since the external terminal electrode is observed as one surface, it is easily recognized as an image, and this allows the distance to be accurately measured.

Since the external terminal electrode protrudes from the first side surface, it is also possible to measure the distance between the external terminal electrode and the first end surface from the side of the first or second principal surface.

According to a preferred embodiment of the present invention, it is possible to easily and accurately measure the side gap, to efficiently remove defective ceramic base bodies, and to design the side gap to have as small a value as possible. Therefore, the size of ceramic base body is prevented from being increased. Furthermore, since the side gap can be measured not only from the side of the first side surface, but also from the side of the first or second principal surface, the degree of flexibility in the measurement direction increases, and measurement can be simultaneously performed on the first and second side surfaces when performed from the side of the principal surface.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Production methods for a laminated electronic component according to preferred embodiments of the present invention will be described below with reference to the attached drawings.

First Preferred Embodiment

Figure 1:
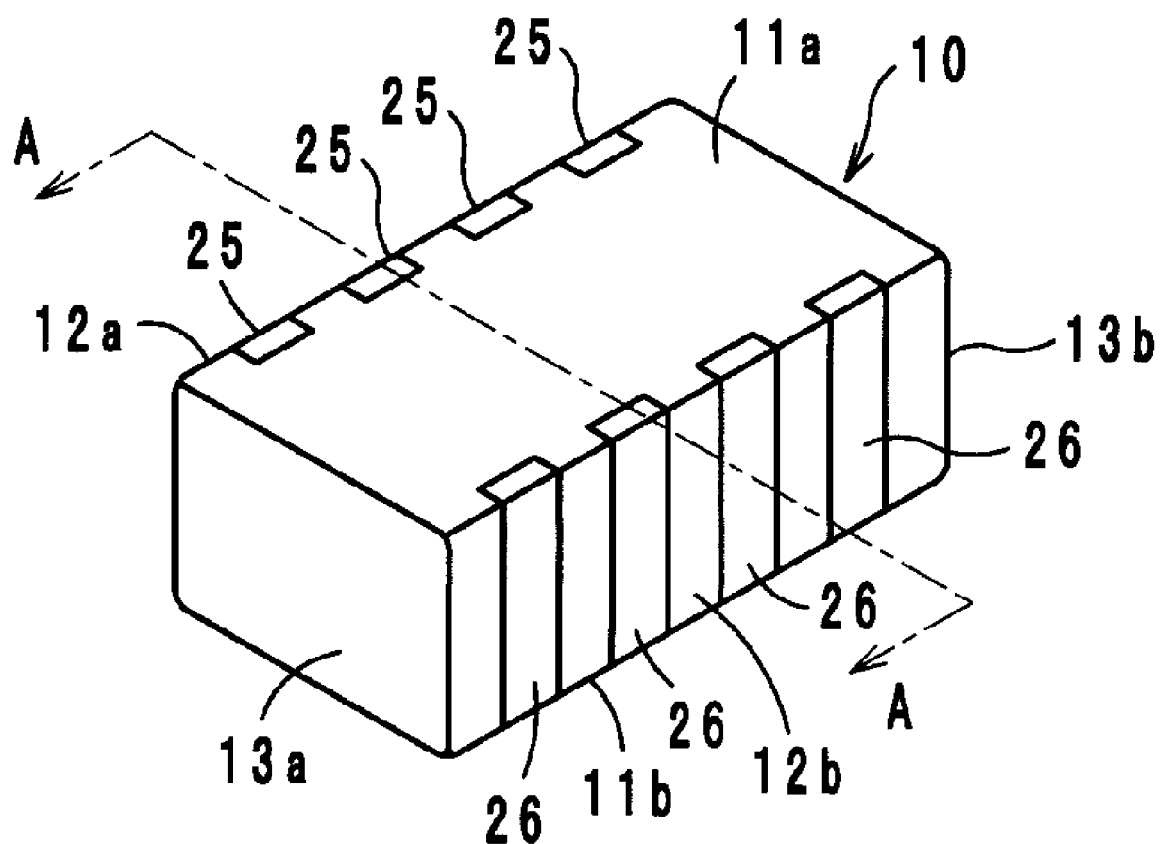
FIG. 1 is a perspective view of a laminated ceramic capacitor array produced according to a first preferred embodiment of the present invention.
Figure 2:
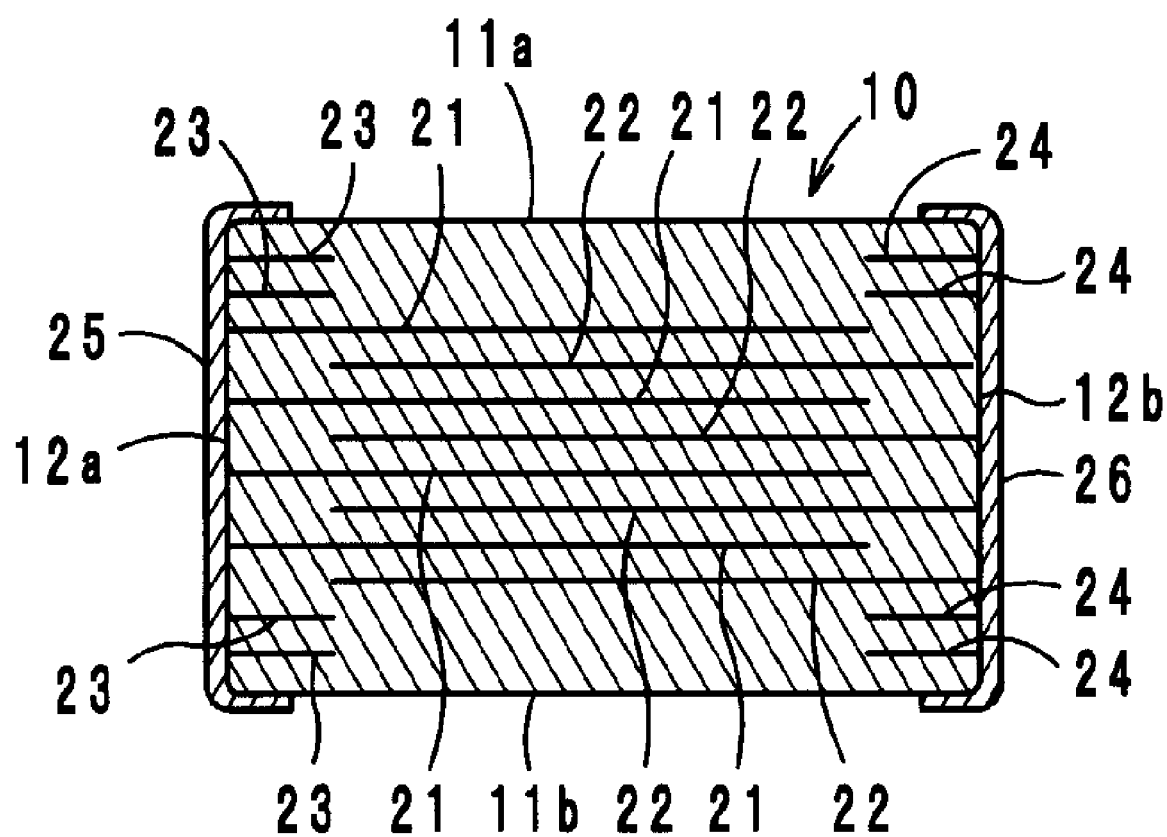
FIG. 2 is a cross-sectional view, taken along line A-A in FIG. 1.
Figure 3:
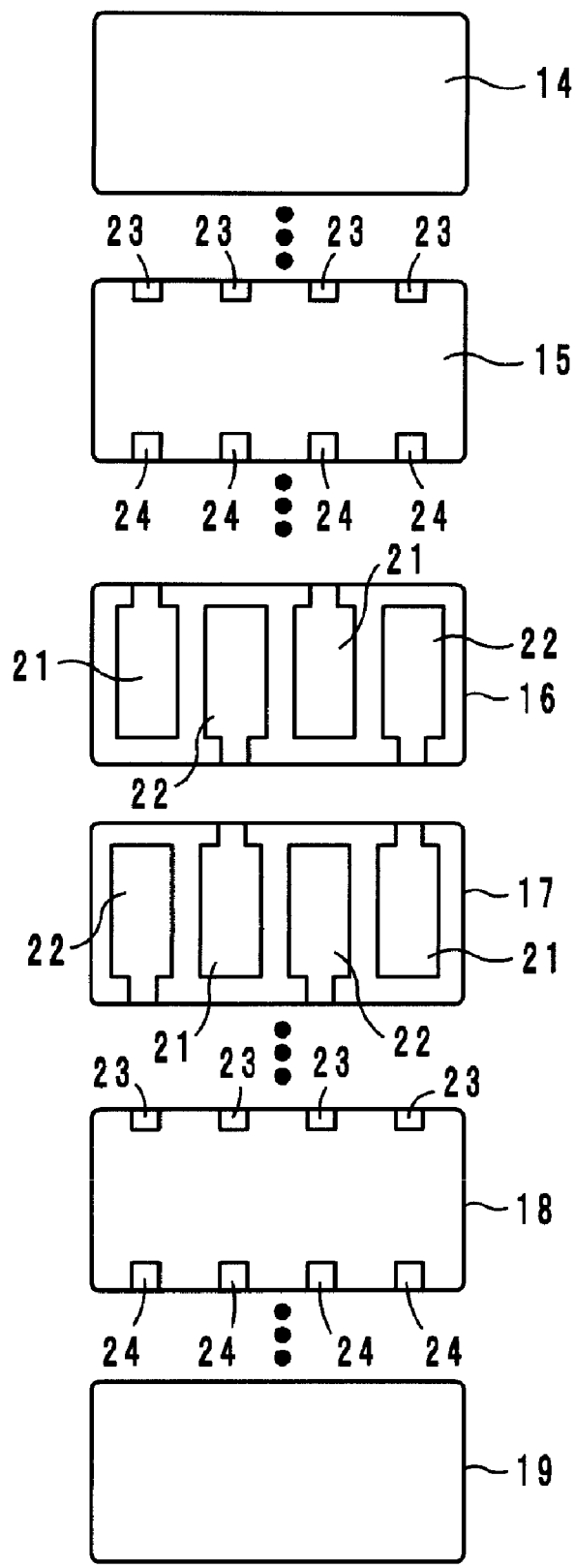
FIG. 3 is an exploded perspective view of layers in the laminated ceramic capacitor array.

A description will now be provided of a laminated ceramic capacitor array produced according to a first preferred embodiment of the present invention. Referring to FIGS. 1 to 3, the laminated ceramic capacitor array includes a ceramic base body 10 formed by stacking a plurality of ceramic layers 14 to 19, and first and second internal electrodes 21 and 22 and first and second internal conductors 23 and 24 provided in the ceramic base body 10.

The ceramic base body 10 has a substantially rectangular parallelepiped shape including first and second opposing principal surfaces 11a and 11b, first and second opposing side surfaces 12a and 12b, and first and second opposing end surfaces 13a and 13b. On the first and second side surfaces 12a and 12b, first external terminal electrodes 25, and second external terminal electrodes 26 are provided, respectively. Each of the first and second external terminal electrodes 25 and 26 are shaped substantially like a vertically extending belt, and are electrically insulated from each other.

The first internal electrodes 21 and the first internal conductors 23 extend to the first side surface 12a, and are electrically connected to the first external terminal electrodes 25. The second internal electrodes 22 and the second internal conductors 24 extend to the second side surface 12b, and are electrically connected to the second external terminal electrodes 26.

Each of the first and second external electrodes 25 and 26 include a lower plating film and an upper plating film, and extend over the first and second side surfaces 12a and 12b and the first and second principal surfaces 11a and 11b. The lower plating films are directly formed on the first and second side surfaces 12a and 12b by plating so as to cover the exposed portions of the first and second internal electrodes 21 and 22. Each of the upper plating films includes a first layer covering the lower plating film and a second layer covering the first layer.

As shown in FIG. 3, the first internal electrodes 21 and the second internal electrodes 22 are adjacent to each other on the ceramic layers 16 and 17, and face each other via the ceramic layer 16 in the stacking direction, thus defining a capacitance.

The first and second internal conductors 23 and 24 are provided on upper and lower outer layers, and function as the cores of growth of the lower plating films. In other words, the first and second internal conductors 23 and 24 help the lower plating films to grow toward the first and second principal surfaces 11a and 11b. The first and second internal conductors 23 and 24 may be omitted. That is, when the number of layers having the first and second internal electrodes 21 and 22 is sufficiently large or when it is unnecessary for the lower plating films to grow to such an extent in the vertical direction, there is no need to provide the first and second internal conductors 23 and 24.

For example, the ceramic layers can preferably be formed of a dielectric ceramic including $BaTiO_3$, $CaTiO_3$, $SrTiO_3$, or $CaZrO_3$, for example, as the main ingredient. Further, an additional ingredient, such as a Mn compound, a Fe compound, a Cr compound, a Co compound, or a Ni compound, for example, may be added to the main ingredient. It is preferable that the thickness of the ceramic layers be about 0.1 µm to about 10 µm, for example, after firing.

The internal electrodes and the internal conductors can preferably be formed of, for example, Ni, Cu, Ag, Pd, Au, or an alloy thereof. It is preferable that the thickness of the internal electrodes be about 0.1 µm to about 2.0 µm after firing, for example.

Preferably, the lower plating films and the upper plating films of the external terminal electrodes are formed of one metal selected from a group of Cu, Ni, Sn, Pb, Au, Ag, Pd, Bi, and Zn, or an alloy containing the selected metal. For example, when the internal electrodes are formed of Ni, it is preferable that the lower plating films be formed of Cu that is highly adhesive to Ni. It is also preferable that the first layers of the upper plating films be formed of Ni having a solder barrier function, and that the second layers be formed of Sn or Au having high wettability. The upper plating films are formed as required, and the external terminal electrodes may include only the lower plating film. It is preferable that the thickness of each plating film be about 1 µm to about 15 µm, for example.

A description will now be given of a production method for the above-described laminated ceramic capacitor array.

A plurality of ceramic green sheets, conductive paste for internal electrodes, and conductive paste for internal conductors are prepared. As a binder and a solvent included in the ceramic green sheets and the conductive paste, well-known organic binders and organic solvents can be used.

The conductive paste is printed in a predetermined pattern on the ceramic green sheets, for example, by screen printing so as to form an internal electrode pattern and an internal conductor pattern.

The ceramic green sheets are stacked to form a mother laminated body. The mother laminated body is pressed in the stacking direction by a hydrostatic press or by other suitable methods, as required.

The green mother laminated body is cut to a predetermined size, thereby cutting out green chips out.

The green chips are fired. While the firing temperature depends on the materials of the ceramic and internal electrodes, it is preferably set to be about 900° C. to about 1300° C., for example.

As required, surfaces from which portions of the internal electrodes are exposed are formed by grinding, such as barrel grinding, for example. Simultaneously, ridges and corners of each laminated body are rounded.

Lower plating films are formed on the exposed portions of the internal electrodes and internal conductors by electrolytic plating or electroless plating. Since electroless plating requires pretreatment with a catalyst in order to increase the deposition speed of plating, the process is more complicated than electrolytic plating. Thus, it is preferable to use electrolytic plating, and to use a barrel plating method.

One or more upper plating films are formed on the lower plating films, as required.

Figure 4:
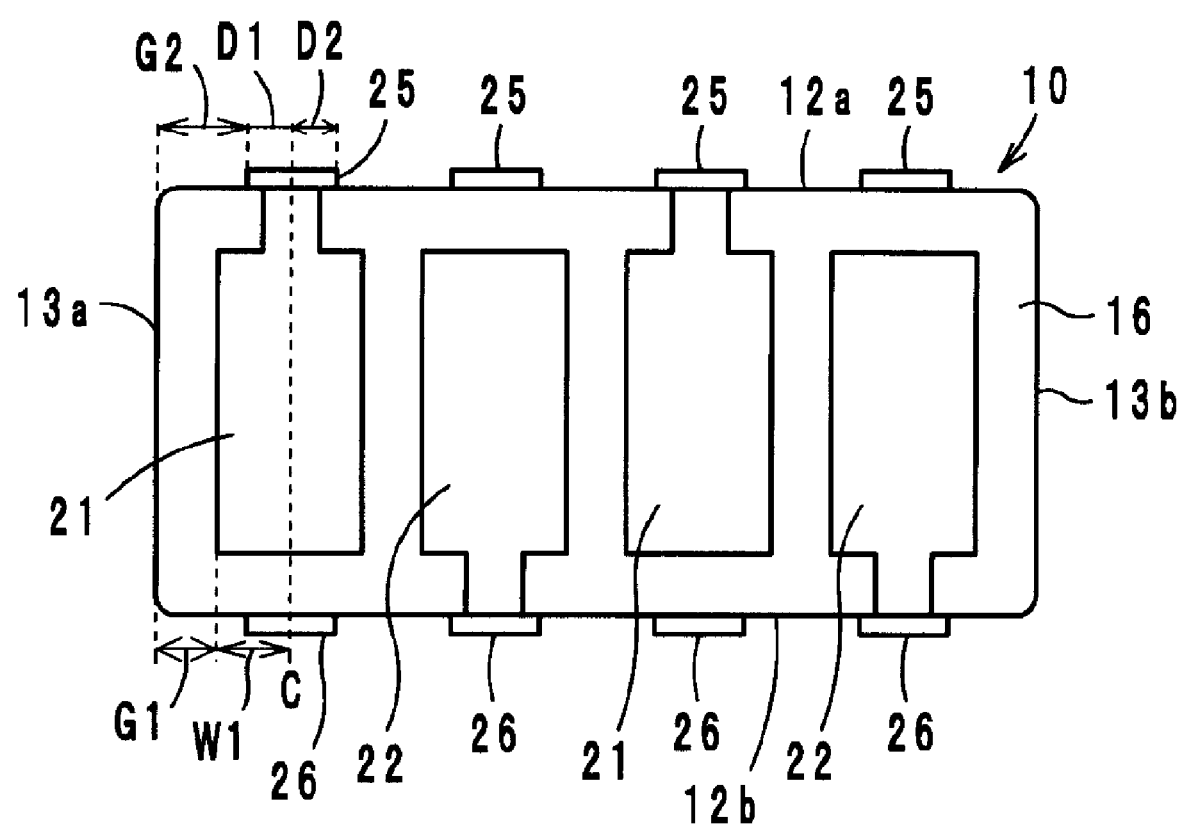
FIG. 4 is a plan view showing a side gap of an array that is judged to be acceptable.
Figure 5:
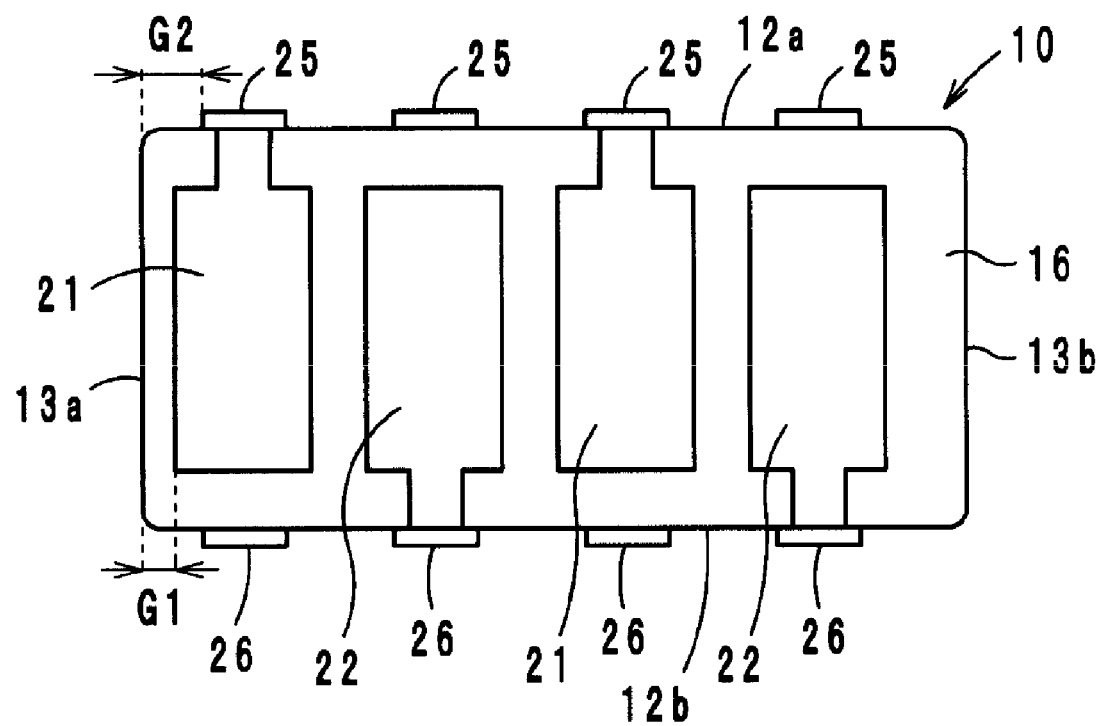
FIG. 5 is a plan view showing a side gap of an array that is judged to be defective.

Capacitor arrays produced by the above-described procedure are screened. FIG. 4 shows a state in which internal electrodes 21 and 22 are formed in an acceptable capacitor array, and FIG. 5 shows a state in which internal electrodes 21 and 22 are formed in a defective capacitor array.

The reference signs in FIG. 4 have the following meanings:

G1: distance (side gap) between the capacity section of the first internal electrode and the first end surface G2: distance between the first external terminal electrode and the first end surface W1: distance between the center line C of the first internal electrode and the side of the capacity section D1: distance between the center line C of the first internal electrode and one side of the first external terminal electrode D2: distance between the center line C of the first internal electrode and the other side of the first external terminal electrode In this preferred embodiment, the external terminal electrodes 25 and 26 include the lower plating films directly formed by plating. Therefore, the external terminal electrodes 25 and 26 grow substantially equally from the exposed portions of the internal electrodes 21 and 22 to the right and left. While the distance W1 primarily depends on the design of the internal electrode pattern and the distance D1 primarily depends on the plating condition, the distances W1 and D1 can be treated as constants in design, because variations can be minimized. Thus, (G1+W1) substantially equals (G2+D1), and the length of the side gap G1 can be found by measuring the distance G2.

Accordingly, acceptable ranges (reference values) of the side gap G1 and the distance G2 are determined beforehand from a group of standard samples defining acceptable arrays. An array whose actually measured distance G2 is within the acceptable range is determined to be an acceptable side-gap array, and an array whose actually measured distance G2 is outside of the acceptable range is determined to be a defective side-gap array and can be removed. FIG. 5 shows a capacitor array that is determined to be defective because the distance G2 is too short.

For example, capacitor arrays are arranged with their first side surfaces 12a pointing upward, and the first side surfaces 12a are observed from above with an image-pickup device such as a CCD camera, so that the distances G2 can be measured. As internal processing of the image-pickup device, for example, image information is binarized, and boundaries between the external terminal electrodes 25 and 26 and the ceramic base body 10 are recognized.

Alternatively, capacitor arrays may be arranged with their first principal surfaces 11a pointing upward, and protruding states of the external terminal electrodes 25 from the first side surfaces 12a may be observed from above with an image-pickup device, such as a CCD, so as to measure the distances G2. In this case, it is possible to simultaneously observe the states of the second side surfaces 12b, and this shortens the screening time. In this measuring method, for example, capacitor arrays disposed on a material having a light reflectance different from those of the external terminal electrodes 25 and 26 and the ceramic base body 10 are observed, and image information is converted into tertiary values by internal processing of the image pickup device so as to recognize the boundaries among the external terminal electrodes 25 and 26, the ceramic base body 10, and the surrounding space, so that the distances G2 can be measured.

Figure 6:
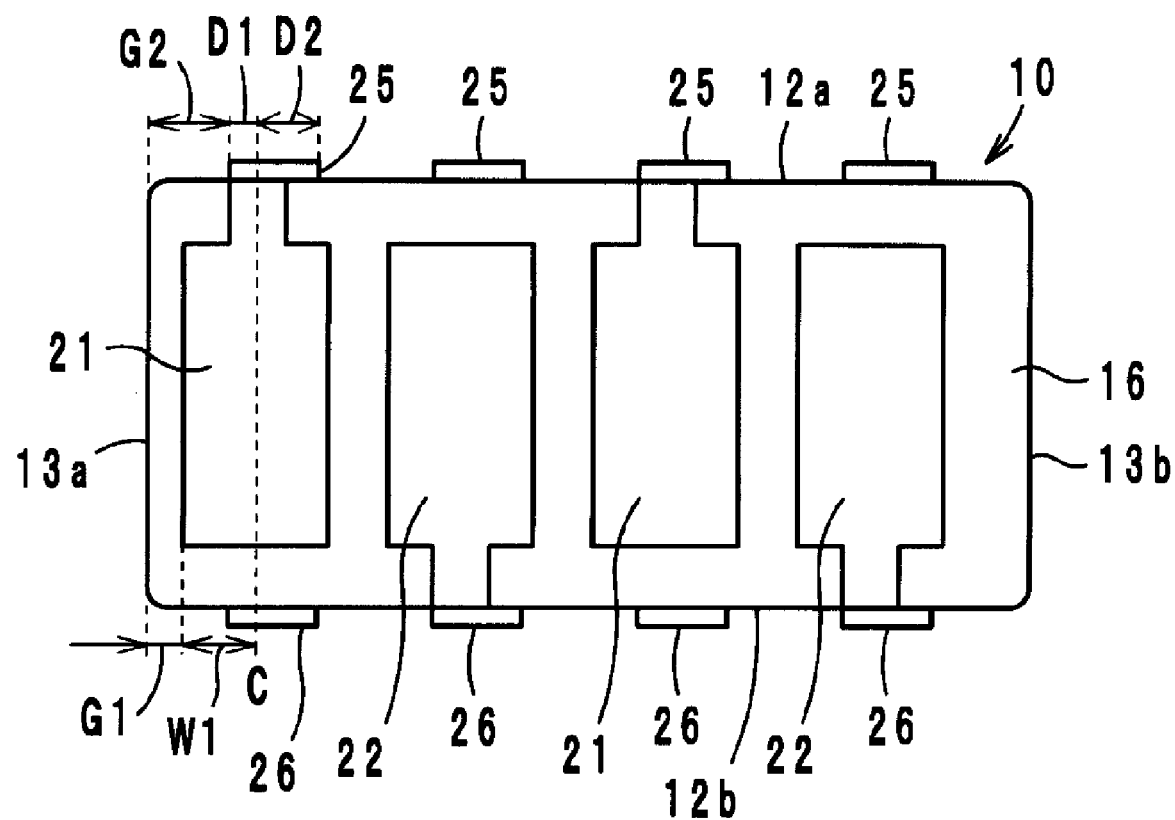
FIG. 6 is a plan view showing a side gap of an array that is erroneously judged to be acceptable in a production method of the related art.

In the method of forming the external terminal electrodes 25 and 26 by applying the paste, as disclosed in the above-described publication, Japanese Unexamined Patent Application Publication No. 10-22183, it is difficult to perform screening with the distance G2 replaced with the side gap G1. The external terminal electrodes 25 and 26 formed by the paste application method of the related art are likely to deviate from the center lines C of the internal electrodes 21 and 22. This is because the accuracy of paste application is limited, and it is difficult to precisely apply the paste on target locations. For this reason, it is difficult to determine that (G1+W1)= (G2+D1). For example, a side-gap defective array shown in FIG. 6 may be erroneously determined to be acceptable. In other words, even when the side gap G1 is not proper, similarly to the case shown in FIG. 5, the capacitor array shown in FIG. 6 may be determined to be acceptable because the side gap G2 is relatively large.

Second Preferred Embodiment

Figure 7:
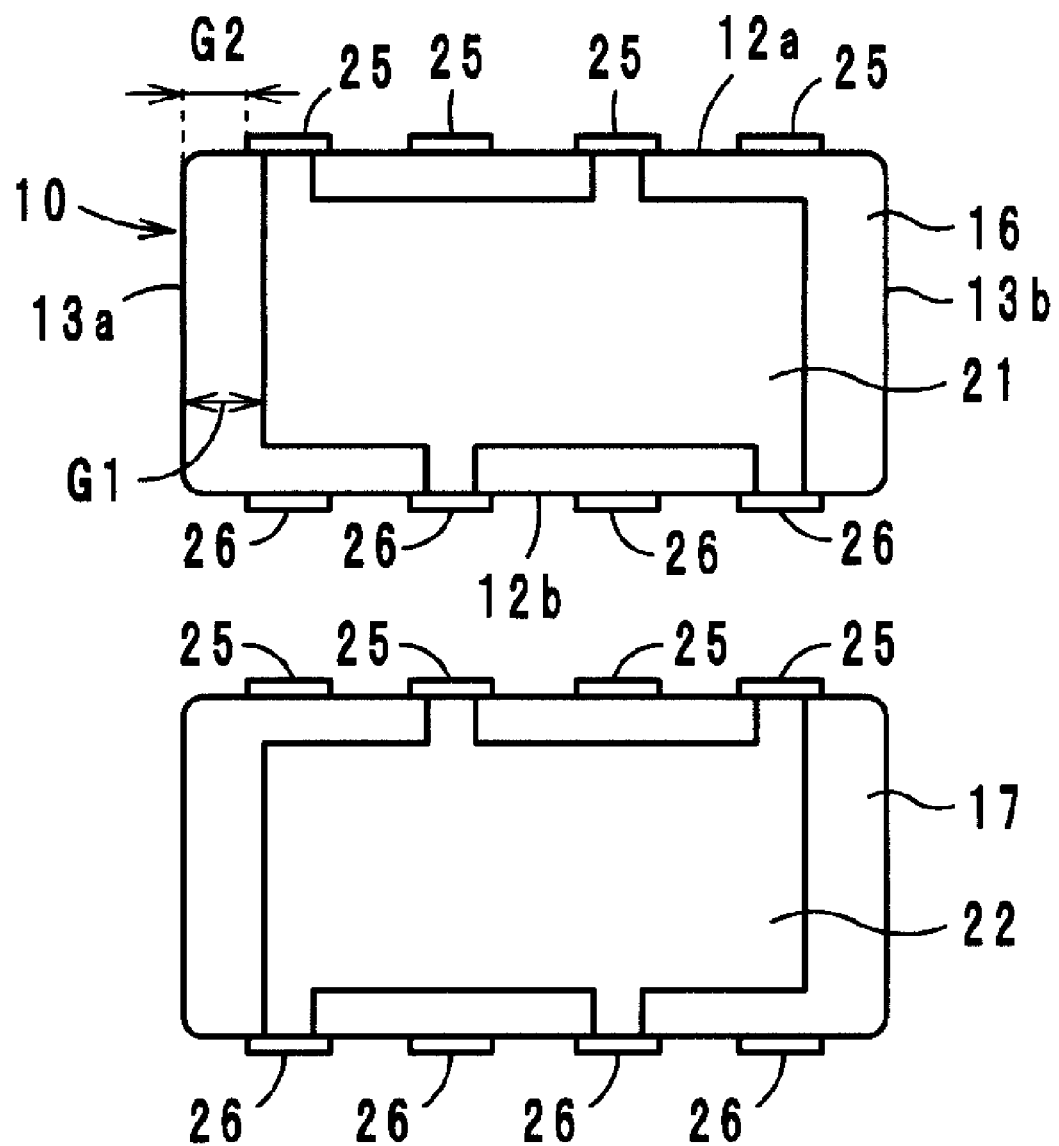
FIG. 7 is a plan view of two layers in a laminated ceramic capacitor produced according to a second preferred embodiment of the present invention.

FIG. 7 shows two ceramic layers in a low-ESL multiterminal laminated ceramic capacitor according to a second preferred embodiment of the present invention. In this laminated ceramic capacitor, first and second internal electrodes 21 and 22 are provided with a plurality of lead-out portions having exposed portions. The exposed portions of the first and second internal electrodes 21 and 22 are offset from each other on first and second side surfaces 12a and 12b of a base body 10. In this laminated ceramic capacitor, the side gap G1 can also be determined by forming external terminal electrodes 25 and 26 on the first and second side surfaces 12a and 12b by plating and measuring the distance G2 from the external terminal electrodes 25 and 26 to end surfaces 13a and 13b of the base body 10.

Third Preferred Embodiment

Figure 8:
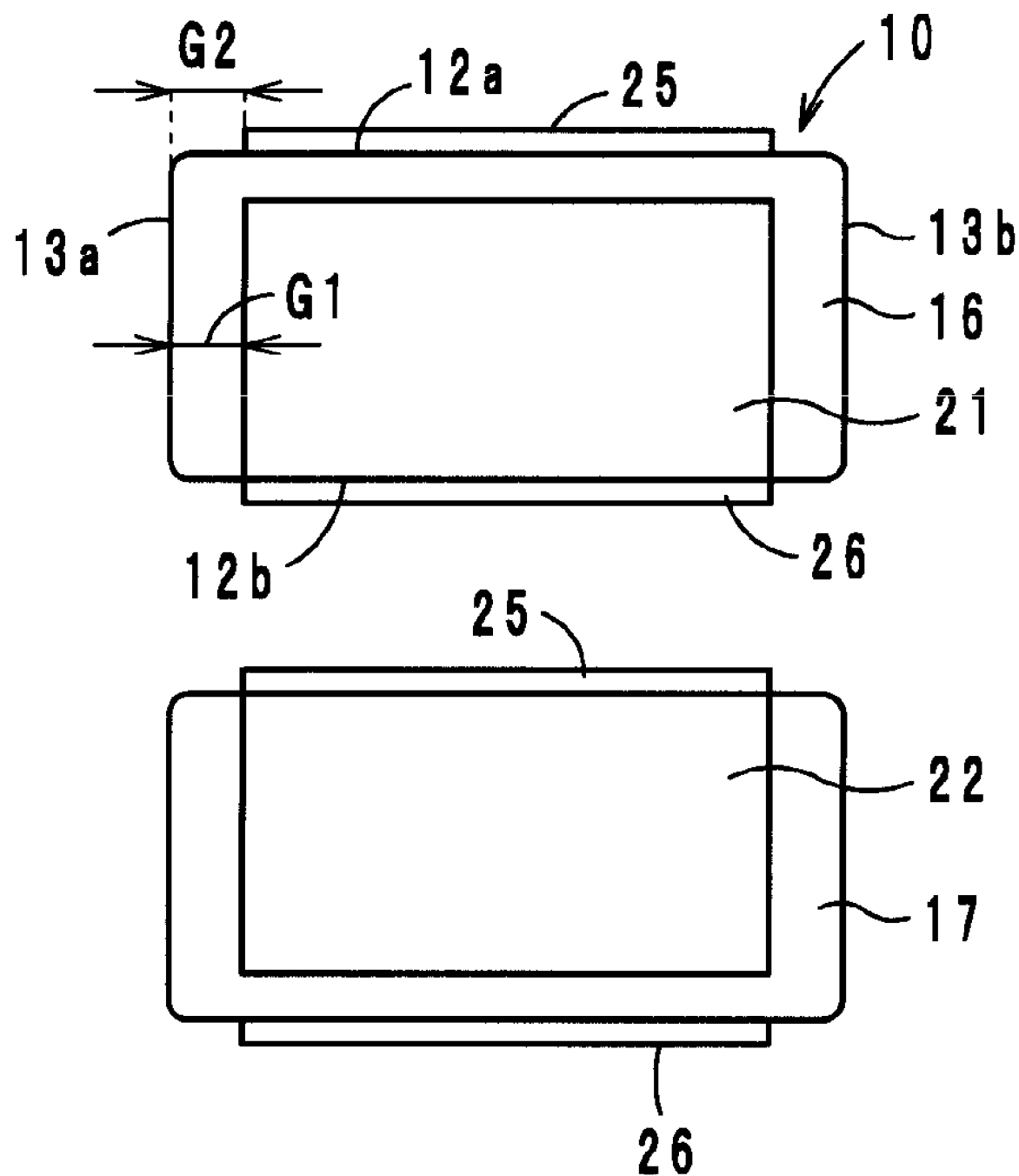
FIG. 8 is a plan view of two layers in a laminated ceramic capacitor produced according to a third preferred embodiment of the present invention.
Figure 9:
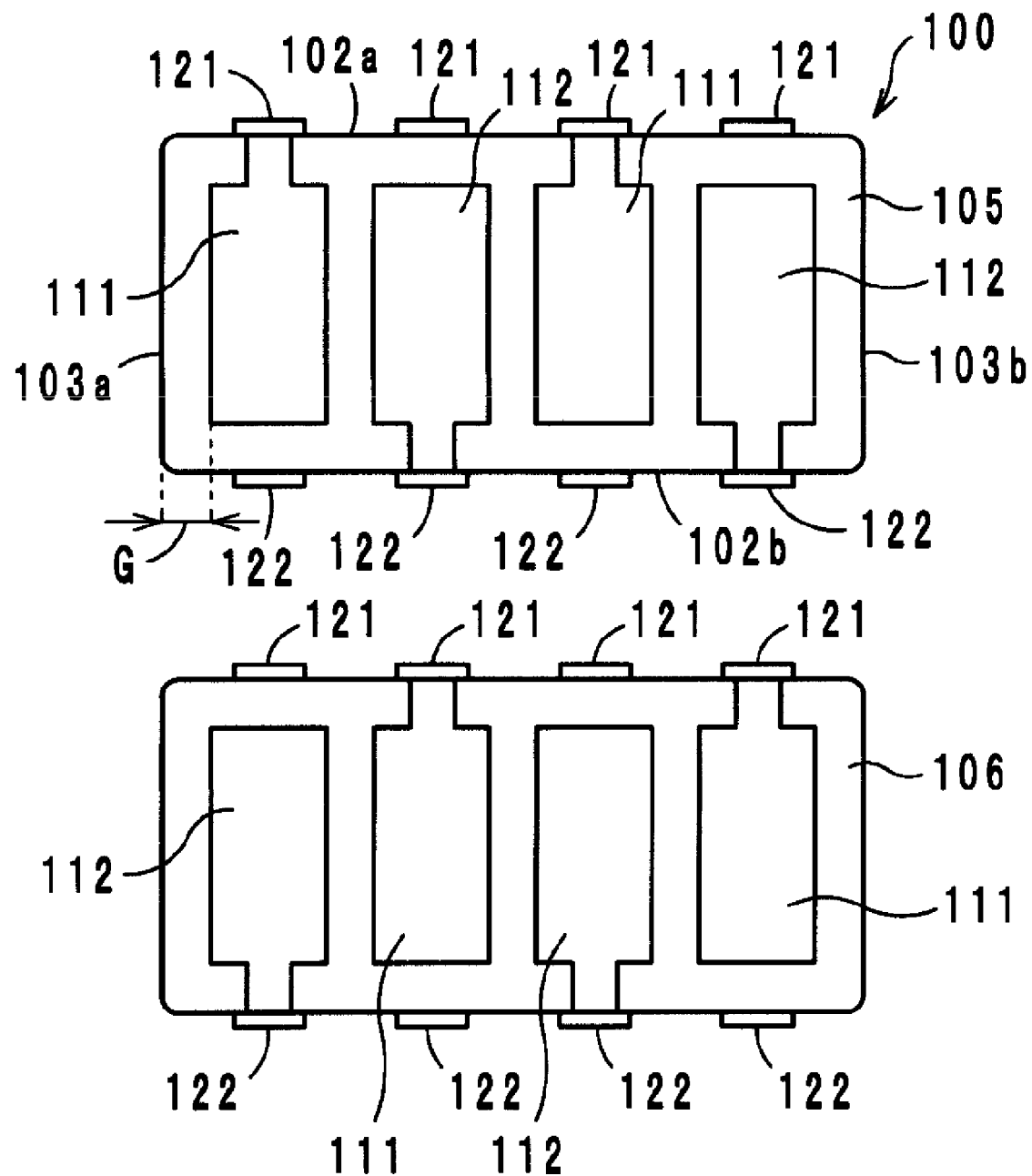
FIG. 9 is a plan view of two layers in a laminated ceramic capacitor array, which shows the problem of the related art.

FIG. 8 shows two ceramic layers in a two-terminal laminated ceramic capacitor according to a third preferred embodiment of the present invention. In this laminated ceramic capacitor, first and second internal electrodes 21 and 22 have long exposed portions, and first and second external terminals 25 and 26 having relatively large areas are provided on first and second side surfaces 12a and 12b of a base body 10. In this laminated ceramic capacitor, the side gap G1 can also be determined by forming the external terminal electrodes 25 and 26 on the side surfaces 12a and 12b by plating and measuring the distance G2 from the external terminal electrodes 25 and 26 to end surfaces 13a and 13b of the base body 10.

The production method for a laminated electronic component of the present invention is not limited to the above-described preferred embodiments, and variations and modifications will be apparent to those skilled in the art without departing from the scope and spirit of the invention. The scope of the present invention, therefore, is to be determined solely by the following claims.

What is claimed is:

1. A production method for a laminated electronic component, comprising the steps of:
    stacking a plurality of ceramic layers to form a ceramic base body including first and second opposing principal surfaces, first and second opposing side surfaces, and first and second opposing end surfaces, and forming internal electrodes in the ceramic base body, each of the internal electrodes including a portion exposed at the first side surface and an edge extending substantially parallel to the first end surface and being spaced away from the first end surface by a distance G1, the internal electrodes having a width less than a width of the first side surface;

forming a plurality of substantially belt-shaped external terminal electrodes on the first side surface by plating, each of the plurality of external terminal electrodes including a plating film electrically connected to the exposed portion of a respective one of the internal electrodes;

measuring a distance G2 from the first end surface to an edge of an external terminal electrode of the plurality of external terminal electrodes located closest to the first end surface;

determining the ceramic base body as being a defective ceramic base body when the measured distance G2 is less than a predetermined reference value; and removing the defective ceramic base body from subsequent steps of the production method; wherein the distance G1 is less than the distance G2.

2. The production method for a laminated electronic component according to claim 1, wherein the internal electrodes include first internal electrodes and second internal electrodes that oppose each other with the ceramic layers disposed therebetween and that are adjacent to each other on the same ceramic layer.

3. The production method for a laminated electronic component according to claim 1, wherein the plating film of each of the plurality of external terminal electrodes defines a lower plating film, and each of the plurality of external terminal electrodes further includes an upper plating film disposed on the respective lower plating film.

4. The production method for a laminated electronic component according to claim 3, wherein each of the upper plating films includes a first layer covering the lower plating film and a second layer covering the first layer.

* * * * *